(12) United States Patent
Mondri et al.

(10) Patent No.: US 9,307,082 B2
(45) Date of Patent: Apr. 5, 2016

(54) ENHANCING COMMUNICATION SESSIONS WITH CUSTOMER RELATIONSHIP MANAGEMENT INFORMATION

(71) Applicant: Microsoft Corporation, Redmond, WA (US)

(72) Inventors: Ron Mondri, Bellevue, WA (US); Madan Natu, Redmond, WA (US); Anthony W Schmidt, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 88 days.

(21) Appl. No.: 13/926,945

(22) Filed: Jun. 25, 2013

(65) Prior Publication Data

US 2014/0376712 A1 Dec. 25, 2014

(51) Int. Cl.
*H04M 3/51* (2006.01)
*H04M 3/42* (2006.01)

(52) U.S. Cl.
CPC ........ *H04M 3/5133* (2013.01); *H04M 3/42059* (2013.01); *H04M 2203/2038* (2013.01); *H04M 2203/556* (2013.01)

(58) Field of Classification Search
CPC .......... H04M 3/5133; H04M 3/42059; H04M 2203/556; H04M 2203/2038
USPC ........... 379/93.17, 93.23, 247, 265.09, 266.1; 715/751, 752, 753
See application file for complete search history.

(56) References Cited

U.S. PATENT DOCUMENTS

| | | | |
|---|---|---|---|
| 8,156,206 B2 | 4/2012 | Kiley et al. | |
| 2007/0093255 A1* | 4/2007 | Nurminen et al. | 455/455 |
| 2008/0172464 A1 | 7/2008 | Thattai et al. | |
| 2010/0115420 A1* | 5/2010 | De Gibon et al. | 715/751 |
| 2011/0105095 A1* | 5/2011 | Kedefors et al. | 455/418 |
| 2011/0179103 A1 | 7/2011 | Ravichandran et al. | |
| 2012/0158864 A1* | 6/2012 | Schindler et al. | 709/206 |
| 2012/0224020 A1* | 9/2012 | Portman et al. | 348/14.02 |

OTHER PUBLICATIONS

"Avaya Agile Communication Environment™ Customer Relationship Management (CRM) Integration", Retrieved at <<http://www.avaya.com/uk/resource/assets/factsheet/GCC4792_ACE_CRM_Integ_FS.pdf>>, Retrieved Date: Feb. 18, 2013, pp. 4.

(Continued)

*Primary Examiner* — Antim Shah
(74) *Attorney, Agent, or Firm* — Thomas Marquis; Jim Ross; Micky Minhas

(57) ABSTRACT

Communication sessions are enhanced with customer relationship management (CRM) information. A unified communication (UC) client application retrieves contextual information associated with a contact through a CRM extension from a CRM application. Opportunities associated with the contact are presented from the contextual information. Contacts associated with a selected opportunity are organized by stakeholder and team member categories and presented through the UC client application. Documents associated with the opportunity are also displayed by the UC client application. Any alterations to the contextual information through one of the presentation views including contact, opportunity, people, and documents are transmitted back to the CRM application through the CRM extension for storage.

19 Claims, 9 Drawing Sheets

(56) References Cited

OTHER PUBLICATIONS

"Contact Center", Retrieved at <<http://msdn.microsoft.com/en-us/library/lync/hh347308.aspx>>, Retrieved Date: Feb. 18, 2013, pp. 4.
"NEC's Unified Communications for Business (UCB) Helps you Build Better Business Relationships", Retrieved at <<http://www.nec.com.au/media/docs/UCB-v62-Overview-brochure-121109-5fe01ed7-05f3-420b-835e-f06a683f117f-0.pdf>>, Retrieved Date: Feb. 18, 2013, pp. 8.
"Cisco Unified Communication System Aids Business Growth for Yorkshire-Based Small Business", Retrieved at <<http://www.cisco.com/en/US/prod/collateral/voicesw/ps6788/vcallcon/ps556/prod_case_study_Direct_Visual.pdf>>, Retrieved Date: Feb. 18, 2013, pp. 3.

* cited by examiner

ENHANCING COMMUNICATION SESSIONS WITH CUSTOMER RELATIONSHIP MANAGEMENT INFORMATION

BACKGROUND

Customer Relationship Management (CRM) solutions provide tools and capabilities needed to create and maintain a clear picture of customers, from first contact through purchase and post-sales. For complex organizations, a CRM system may provide features and capabilities to help improve the way sales, marketing, and/or customer service organizations target new customers, manage marketing campaigns, and drive sales activities. CRM systems may include many components, hardware and software, utilized individually or in a shared manner by users internal or external to an organization.

Parallel to advances in CRM solutions, advances in technology have enabled proliferation of cellular phone networks over the last decade as an alternative to Public Switched Telephone Network (PSTN) systems, where users with cellular phones have access to one or more networks at almost any location. Also a recent development is the wide spread use of Voice over IP (VOIP) telephony, which uses internet protocol (IP) over wired and wireless networks. With the availability of such diverse types of communication networks and devices capable of taking advantage of various features of these networks, enhanced communication systems bring different communication networks together providing until now unavailable functionality such as combining various modes of communication (e.g. instant messaging, voice/video communications, data/application sharing, white-boarding, and other forms of communication may be combined with presence and availability information of subscribers).

This technology is also referred to as Unified Communications (UC). UC systems provide communication infrastructure to variety of enterprise organizational demands. Expansion in enterprise environments have enabled integration of UC systems with other traditional enterprise resources such as content providers and user account systems. However, integration with CRM systems is presently in its infancy. Legacy CRM solutions seldom interact with external systems to expand utilization of vast information maintained by CRM systems.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enhancing communication sessions with customer relationship management (CRM) information. A unified communication (UC) client application may utilize a call identifier associated with a call to search a CRM application. The UC client application may submit a call identifier including a phone number, a contact name, a contact credential, and similar ones to the CRM application. Contextual information of a contact associated with the call identifier may be retrieved and displayed in the UC client application.

An opportunity associated with the contact may be displayed in an opportunity view in response to a first action selecting the opportunity from the displayed contextual information. The opportunity may include previous activity information associated with the opportunity. Next, documents associated with the opportunity may be displayed in a documents view in response to a second action selecting the documents. Actions to transmit or present the documents may be presented through the documents view. In addition, contacts associated with the opportunity may be presented in a people view. Actions to interact with the contacts may be presented through the people view.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
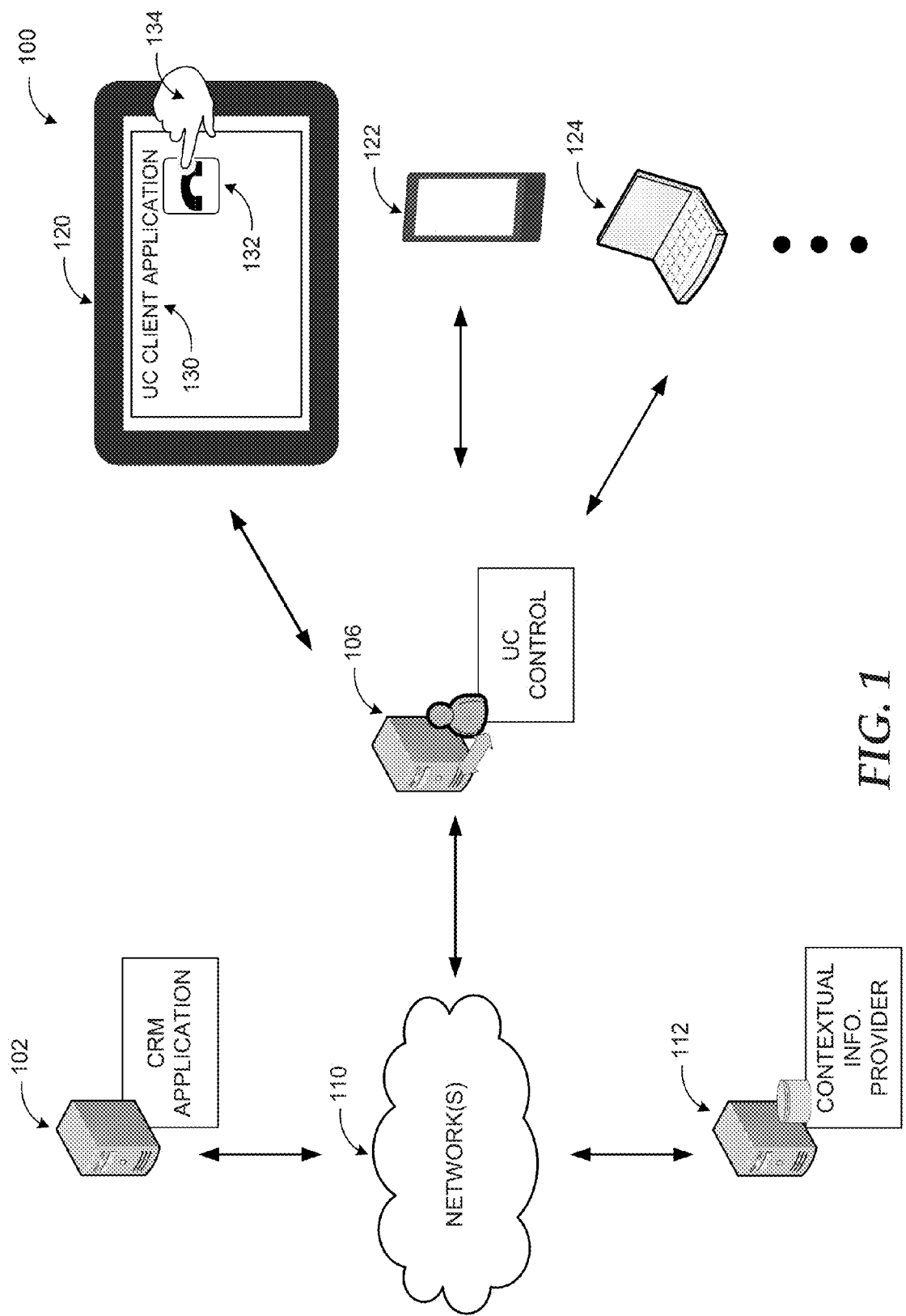
FIG. 1 is a diagram illustrating an example enhanced communications system such as a unified communication (UC) system, where embodiments may be implemented for enhancing communication sessions with customer relationship management (CRM) information.

As briefly described above, communications may be enhanced with customer relationship management (CRM) information associated with the communication. A unified communications (UC) client application may search a CRM application using a call identifier associated with a call to retrieve contextual information associated with the call identifier. The UC client application may display the contextual information in a contact view. In addition, the UC client application may display an opportunity, associated documents, and associated contacts in separate views in response to actions selecting the opportunity, the documents, and the people. Actions associated with the opportunity, the documents, and the contacts may be presented through the views used to display them.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components for enhancing communication sessions with CRM information. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 includes diagram 100 illustrating an example enhanced communications system such as a UC system, where embodiments may be implemented for enhancing communication sessions with CRM information. A unified communication (UC) system is an example of modern communication systems with a wide range of capabilities and services that can be provided to subscribers. A unified communication system is a real-time communications system facilitating email exchange, instant messaging, presence, audio-video conferencing, web conferencing, and similar functionalities.

In a unified communication (UC) system such as the one shown in diagram 100, users may communicate via a variety of end devices including a tablet 120, a smart phone 122, and a laptop computer 124, which are client devices of the UC system. Each client device may be capable of executing one or more communication applications such as UC client application 130 for voice communication, video communication, instant messaging, application sharing, data sharing, and similar ones. End devices 120, 122, 124 may include any type of smart phone, cellular phone, any computing device executing a communication application, a smart automobile console, and advanced phone devices with additional functionality.

Client devices 120, 122, 124 may execute the UC client application 130 to facilitate communications between users. A user may interact with the UC client application through controls displayed by the application such as call button 132. The user may interact with the call button through a touch action 134. The UC client application 130 may integrate input capability of the device 120 and enable interactivity such as the touch action 134 based on the available input capabilities of the device 120. Input type provided by end devices 120, 122, and 124 are not limited to touch input but may include keyboard, audio, visual, gesture, pen, and similar ones.

The UC system shown in diagram 100 may include a number of servers performing different tasks. For example, UC control server 114 may reside in a perimeter of a network(s) 110 and enable connectivity through the network(s) 110 with external users or server 102 and 112. Server 102 may execute a CRM application maintaining customer information such as sales, inventory, purchases, and similar ones. The CRM application may manage and present expansive customer related information including organizational transactions, relationships, and analysis information. Analysis information may include sales history, present consumption trends, and future sales predictions based on customer transactions.

The server 112 may host contextual information. Contextual information may include data associated with customers, transactions, etc. An example may include a contact data store hosting contact information including contacts' first name, last name, email address(es), phone number(s), credentials for communication applications, and similar ones. Another example may include an organizational information data store hosting data associated with organizational members and relations. The contextual information hosted by server 112 may be utilized by the CRM application or UC client application 130 to enhance presented information. In an example scenario, CRM application may retrieve contextual information associated with a contact (i.e.: a customer) from a human resources data store hosted by server 112 and integrate contact attributes from the contextual information into the stored contact information.

UC control server 106 may also act as a Session Initiation Protocol (SIP) user agent. In a UC system, users may have one or more identities (such as a call identifier), which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer. Various components of the system may communicate using protocols like SIP, hypertext transport protocol (HTTP), and comparable ones.

While the example system in FIG. 1 has been described with specific components UC control server 106, server 102 executing the CRM application, and server 112 hosting contextual information, embodiments are not limited to these components or system configurations and can be implemented with other system configuration employing fewer or additional components. An alternate example, the UC control server 106 may execute the CRM application and host contextual information. In another alternate example, the client devices 120, 122, and 124 may be enabled to access the server 102 executing the CRM application directly and retrieve contextual information associated with contacts from local data stores. Furthermore, embodiments are not limited to UC systems. The approaches discussed here may be applied to any data exchange in a networked communication environment using the principles described herein.

Figure 2:
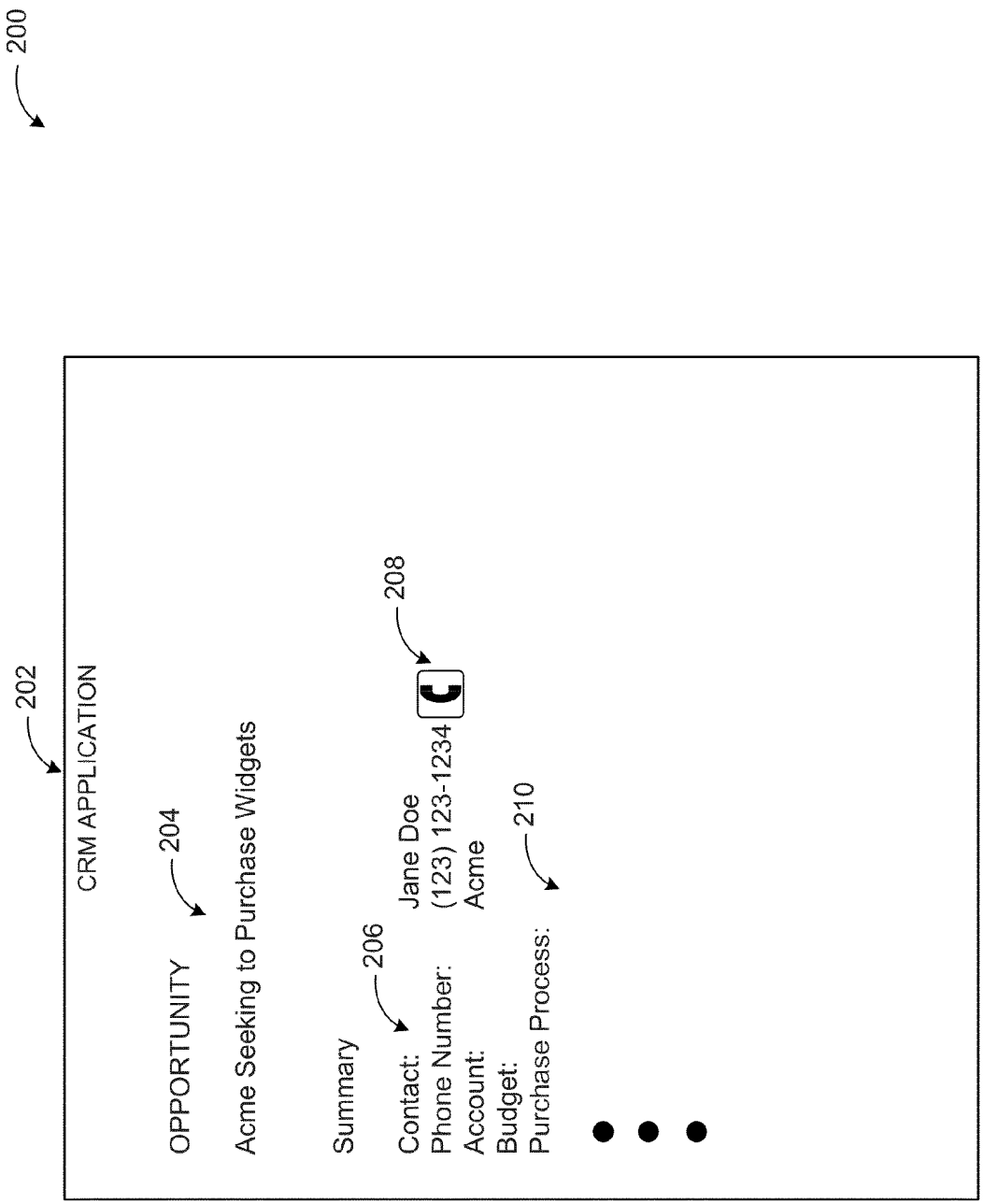
FIG. 2 is an example user interface of a CRM application providing communication controls to enhance communication sessions with CRM information, according to embodiments.

FIG. 2 is an example user interface of a CRM application providing communication controls to enhance communication sessions with CRM information, according to embodiments. Diagram 200 illustrates an example CRM application providing a communication control 208 to provide a click to call feature associated with a CRM entity such as an opportunity.

An opportunity is a CRM entity encompassing sales information, activities, participants associated with sale of a product. An example may include opportunity 204 for a future sale of a product. The CRM application 202 may display an opportunity view within a client interface to a user in response to user provided input matching the opportunity 204. The client interface may be a local interface displayed on a device in interaction with the user. Alternatively the client interface may be a web browser displaying a CRM web application hosted by a CRM server.

The CRM application 202 may display contextual information associated with the opportunity including a contact 206. Additional contextual information associated with the contact 206 may be displayed including phone number, account, budget, purchase process, and similar ones. Budget value may include a number range. The purchase process may include a purchase order, a payment method, and similar one. Additional contextual information associated with the opportunity may be displayed by the CRM application 202 including sales information associated with the opportunity. The CRM application 202 may also display relationship information associated with contact 206 and other entities such as other contacts within an organization associated with the contact 206.

In addition, the CRM application may display a communication control 208 to initiate a call with the contact 206. The communication control may be associated with a CRM extension. The CRM extension may launch a UC client application to initiate the call. Alternatively, the CRM extension may trigger a present UC client application to initiate the call. Initiating the call through a communication control 208 may be defined as a click to call functionality. The CRM extension may facilitate transmission of contextual information associated with the opportunity for displaying in the UC client application during the call.

Figure 3:
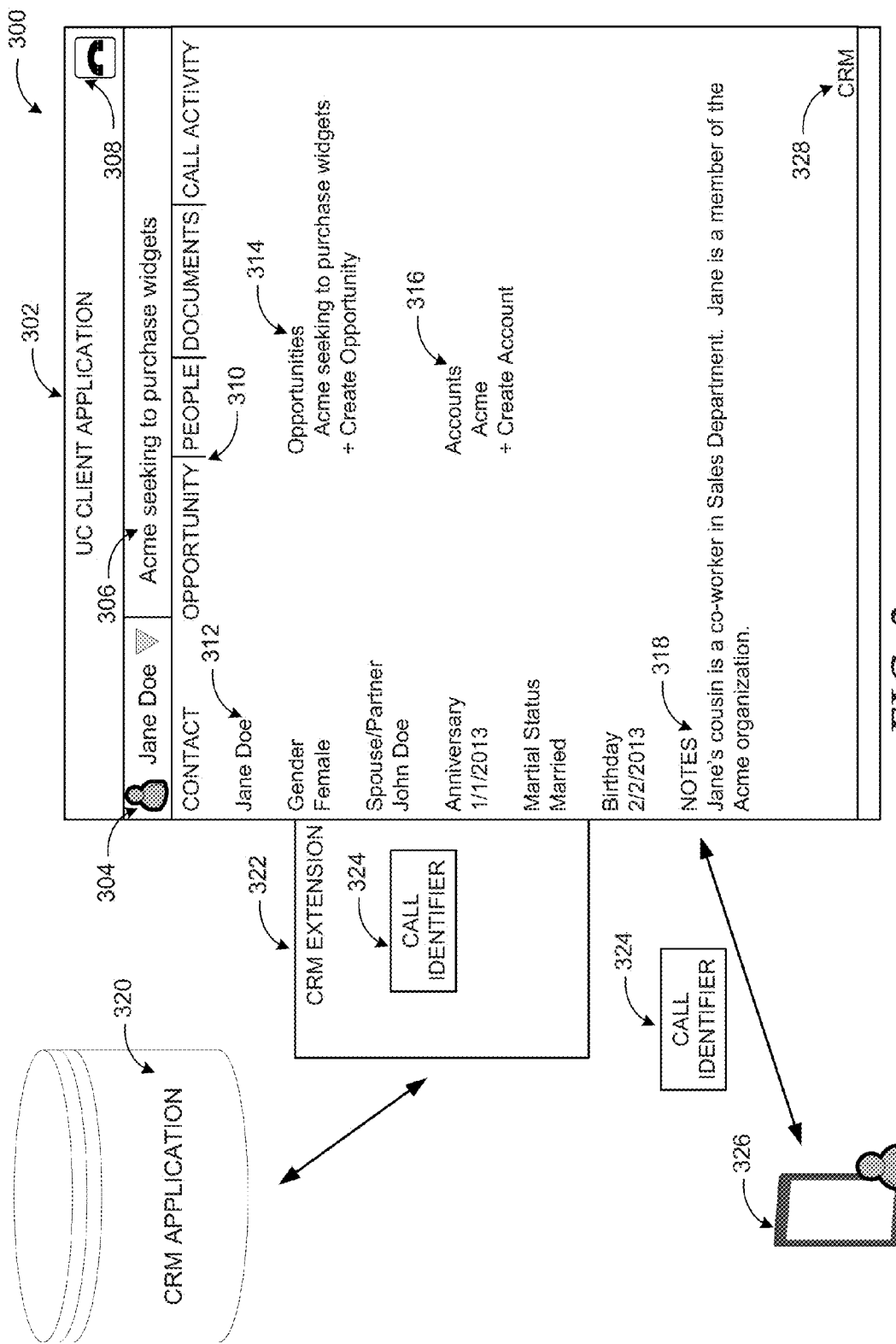
FIG. 3 is a conceptual diagram illustrating an example user interface of a UC client application enhancing communication sessions with CRM information, according to embodiments.

FIG. 3 is a conceptual diagram illustrating an example user interface of a UC client application enhancing communication sessions with CRM information, according to embodiments.

As shown in the diagram 300, a UC client application 302 may utilize a CRM extension 322 to display contextual information from a CRM application 320 associated with a call. A user may initiate a call with a contact using a call identifier 324 by providing the call identifier 324 to the UC client application 302 executing in the client device 326. The call identifier may be a phone number provided by the user to the UC client application 302. The UC client application may initiate the call with the contact 304 using the call identifier 324. The UC client application 302 may display a graphic and other identifier information associated with the contact 304. The UC client application 302 may also provide a call control 308 to manage the call. Some example actions provided by call control 308 may include hanging up the call, put the call on hold, add additional contacts into the call, and similar ones.

The UC client application 302 may instantiate the CRM extension 322 with the call identifier 324. The CRM extension may transmit the call identifier 324 to the CRM application 320. The CRM application 320 may search for contextual information associated with the contact using the call identifier 324. The CRM application 320 may transmit contextual information associated with the contact to the CRM extension for integration of the contextual information into the UC client application 302. The UC client application 302 may display the contextual information in an integrated CRM extension window within its user interface formatted by the CRM extension 322 to match user interface characteristics of the CRM application 320. Alternatively, the UC client application 302 may display the contextual information by analyzing the contextual information and grouping attributes based on structure schemes provided by the CRM extension 322 and formatting the information based on internal specifications.

The UC client application 302 may display contextual information associated with the contact such as extended contact information 312. The extended contact information may include name, gender, spouse/partner, anniversary, marital status, birthday, and similar ones. Notes 318 associated with the contact may also be presented. In addition, an opportunities section 314 may provide an actionable link and summary information associated with one or more opportunities associated with the contact. In response to an action on the actionable link, the UC client application 302 may display an opportunity view to present context information associated with the opportunity. Furthermore, a create opportunity control may be presented to display an empty opportunity view to be filled out in order to create an opportunity associated with the displayed contact.

The UC client application 302 may also display a label 328 to inform the user that the displayed context information is associated with the CRM application 320. In addition, the UC client application 302 may also display actionable tab controls 310 to switch views of the contextual information retrieved from the CRM application 320. The views may display contextual information associated with the subject matter of the views including opportunity, documents, contacts (people), and call activity views. In addition, an addition, an edit, or an update functionality to the contextual information may be provided by any view of the UC client application 302. The UC client application 302 may transmit an addition, an update, or an edit of the contextual information through the CRM extension 322 for storage at the CRM application 320. In an example scenario, notes associated with the contact may be updated by the user. The update may be transmitted to the CRM application 320 through the CRM extension 322 for storage.

Figure 4:
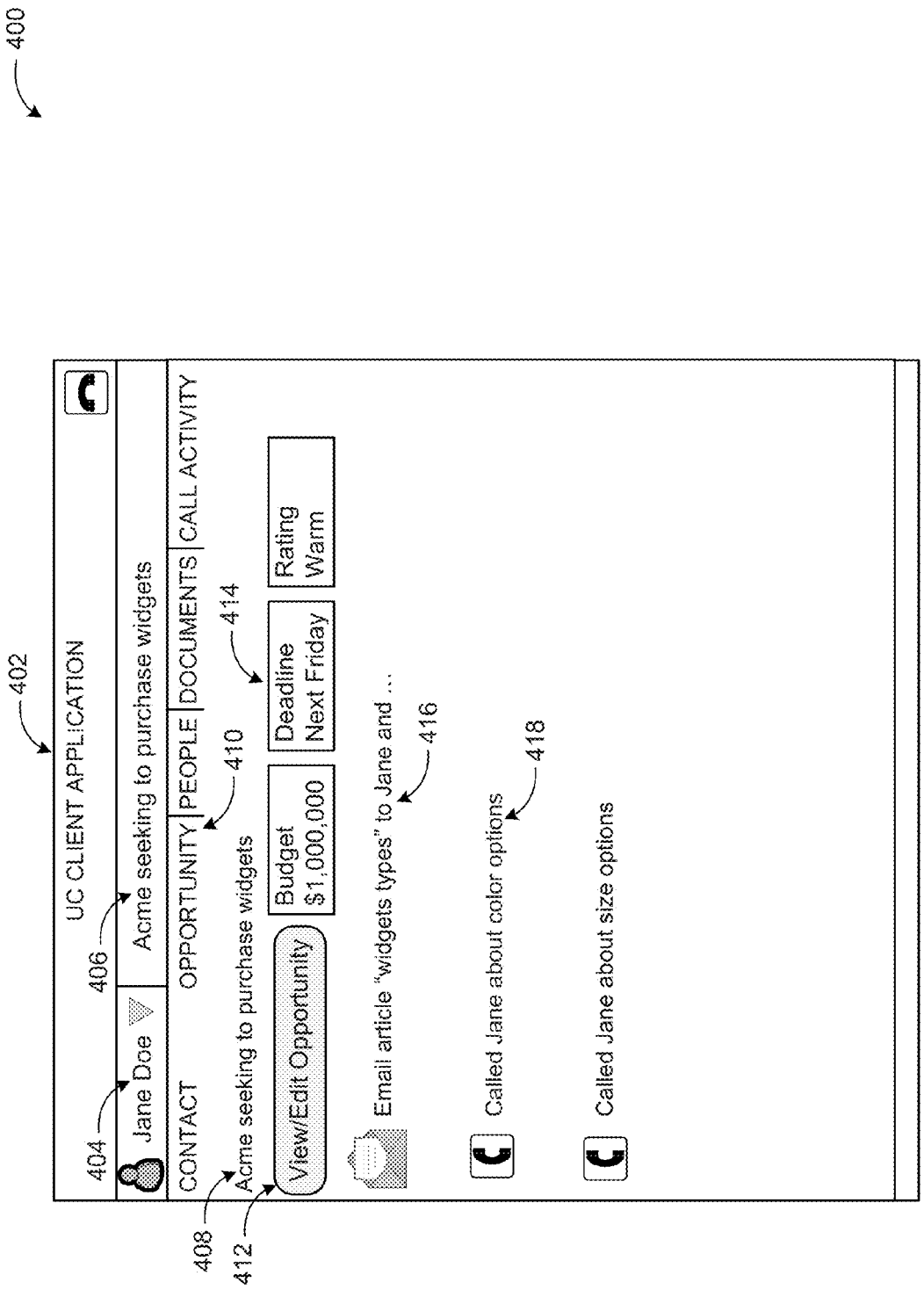
FIG. 4 illustrates an example of enhancing communication sessions with CRM information presenting opportunities, according to embodiments.

FIG. 4 illustrates an example of enhancing communication sessions with CRM information presenting an opportunity, according to embodiments.

As shown in the diagram 400, a UC client application 402 may display an opportunity view 410 in response to user selection of an opportunity actionable link associated with the contact or a user selection of an actionable tab control to display the opportunity view 410. The opportunity view 410 may be displayed within CRM extension window located inside the UC client application 402. Alternatively, the opportunity view may be displayed within a section of the UC client application 402.

The UC client application 402 may display a summary of the opportunity 408 and additional contextual information associated with the opportunity including budget, deadline, rating, and similar ones. A control 412 to view additional attributes may be provided to initiate an edit view of displayed contextual information associated with the opportunity. Any changes and updates to the contextual information associated with the opportunity is transmitted to the CRM application through the CRM extension for storage. New information added to the opportunity is also transmitted to the CRM application through the CRM extension for storage in the contextual information associated with the opportunity or the contact associated with the opportunity.

In addition, actionable activity information 416 and 418 associated with the opportunity may be displayed. The actionable activity information may be activated to display detailed information associated with the previous activity. Furthermore, actionable controls may be displayed adjacent to the actionable activity information 416 and 418 to initiate a communication session with a contact associated with the previous activity or to display content associated with the previous activity such as emails, notes, messages and similar ones.

Figure 5:
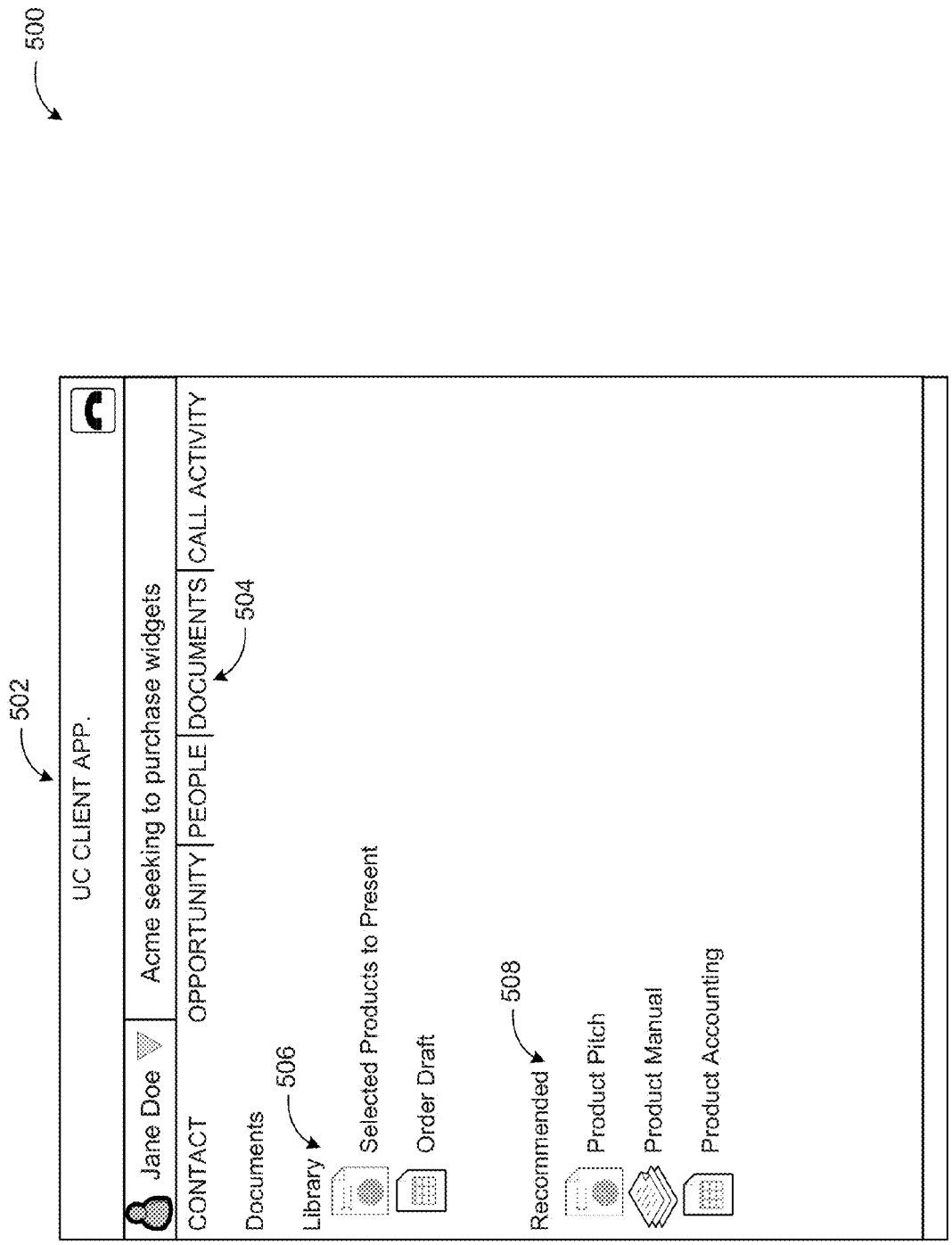
FIG. 5 illustrates another example of enhancing communication sessions with CRM information presenting documents associated with an opportunity, according to embodiments.

FIG. 5 illustrates another example of enhancing communication sessions with CRM information presenting documents associated with an opportunity, according to embodiments.

In response to a user selection of a tab control 504 associated with a documents view, the UC client application 502 may display the documents view. The documents view may present documents associated with the opportunity selected by the user. The UC client application may retrieve documents and contextual information associated with the documents from the CRM application through the CRM extension using the call identifier and opportunity information for the selected opportunity. The UC client application 502 may display document summaries and actionable controls to open a document locally, send the document to a call participant such as the contact or another participant, or present the document to a call participants through a document presentation view.

In addition, the UC client application may present documents in a recommended category 508 to the user and call participants based on matching the documents to contextual information associated with the contact such as business preferences of the contact. Library of documents 506 may also be presented to the user and call participants based on association of the documents with the contact or the opportunity as stored in the CRM application. Documents may be associated by the CRM application based on user tagging of the documents with the opportunity. Alternatively, the CRM application may search content of documents stored in the CRM application and associate documents referring to the opportunity or the contact associated with the opportunity. Furthermore, the UC client application 502 may monitor any edits in presented documents or addition of new documents to the documents view and transmit the new documents or edits to the existing documents to the CRM application through CRM extension for storage in the CRM application. The CRM application may store the edits, updates, and new documents while maintaining the association between the documents, the opportunity and the contact.

Figure 6:
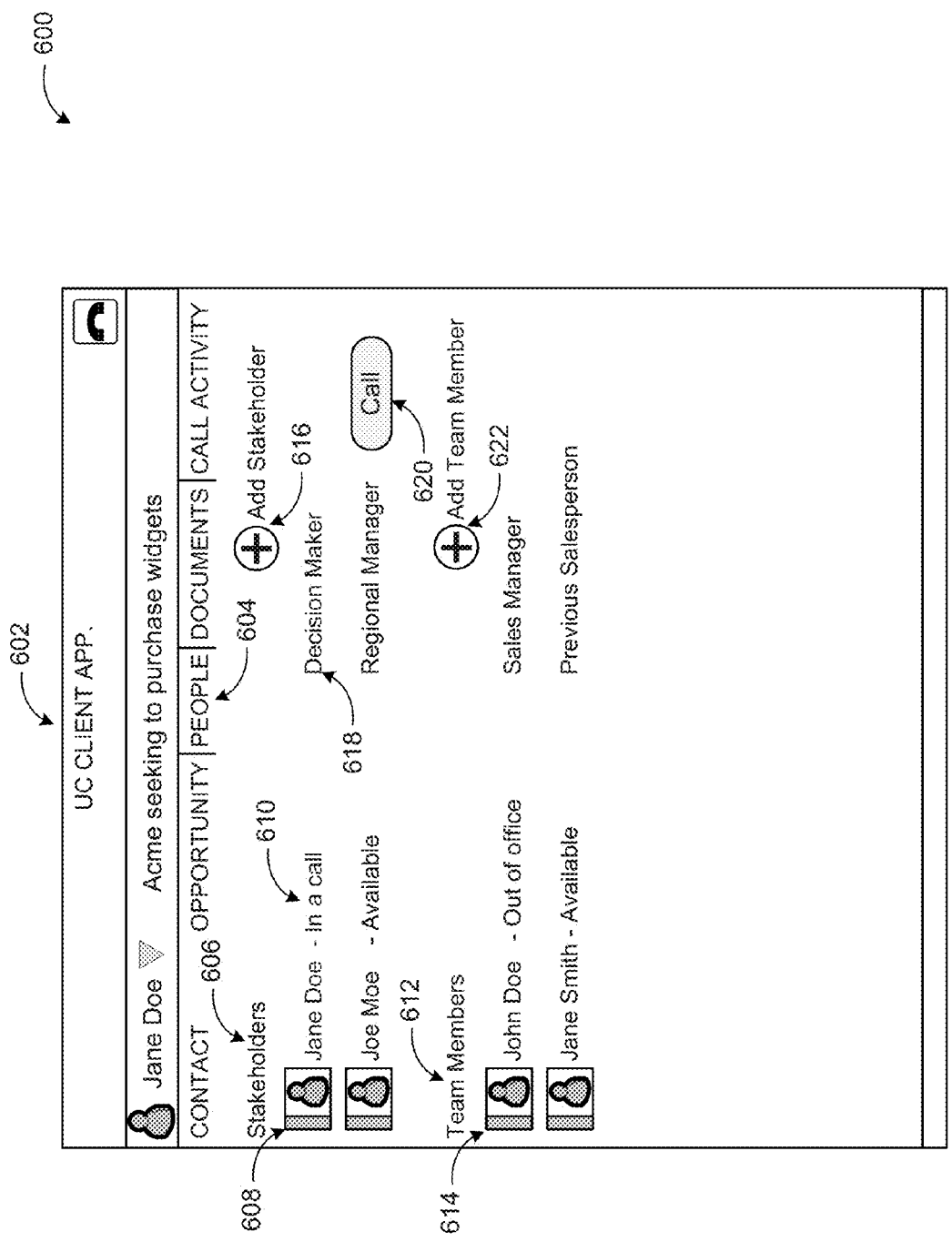
FIG. 6 illustrates another example of enhancing communication sessions with CRM information presenting contacts associated with an opportunity, according to embodiments.

FIG. 6 illustrates another example of enhancing communication sessions with CRM information presenting contacts associated with the opportunity, according to embodiments.

As shown in diagram 600, in response to a user action selecting a tab control 604 associated with contacts, the UC client application 602 may display a people view to present contacts associated with the opportunity. The contacts may be presented under role categories such as stakeholders 606 and team members 612. Additional contextual information associated with the contacts may be displayed in status information 610 describing presence information of the contacts. Presence information may also be represented in a graphic 608 and 614 displaying colors associated with presence status to a contact.

The contextual information, such as presence information, associated with the contacts may be retrieved from sources other the CRM application. The UC client application 602 may retrieve the contextual information from organizational contact, calendar, human resources, and similar data providers. According to other example scenarios, the UC client application 602 may also display role information 618 associated with the contacts presented by the people view. Furthermore, the UC client application may enable the user to add a stakeholder 616 or a team member 622 through the people view by providing controls to enable such actions. A new addition or an update to a stakeholder or a team member may be transmitted to the CRM application for storage through the CRM extension.

In addition, the UC client application 602 may provide controls associated with contacts presented in the people view to establish a communication with one or more contacts. In an example scenario, a control 620 may be provided to initiate a call with a contact. The UC client application 602 may also provide controls to start a chat, a message session, add to an existing call, and similar ones to interact with one or more contacts in the people view.

The example scenarios and schemas in FIG. 2 through 6 are shown with specific components, data types, and configurations. Embodiments are not limited to systems according to these example configurations. Enhancing communication sessions with CRM information may be implemented in configurations employing fewer or additional components in applications and user interfaces. Furthermore, the example schema and components shown in FIG. 2 through 6 and their subcomponents may be implemented in a similar manner with other values using the principles described herein.

Figure 7:
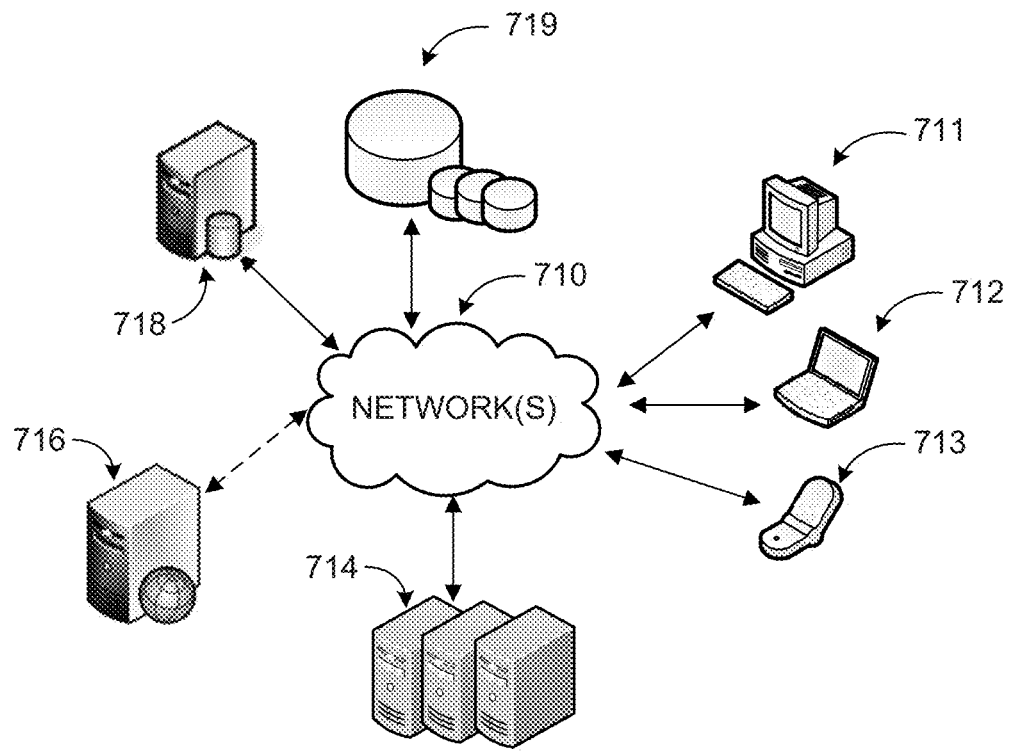
FIG. 7 is a simplified networked environment, where a system according to embodiments may be implemented.

FIG. 7 is an example networked environment, where embodiments may be implemented. A system prioritizing multi-modal communication over wireless networks may be implemented via software executed over one or more servers 714 such as a hosted service. The platform may communicate with client applications on individual computing devices such as a smart phone 713, a laptop computer 712, or desktop computer 711 ('client devices') through network(s) 710.

Client applications executed on any of the client devices 711-713 may facilitate communications via application(s) executed by servers 714, or on individual server 716. A UC client application executed on client devices may retrieve contextual information associated with the contact using a call identifier from a CRM application. The contextual information associated with the contact may be displayed in a contact view by the UC client application. In response to a user action, the UC client application may display contextual information associated with an opportunity with the contact and documents and people associated with the opportunity in corresponding views. The application may store the updates or additional data associated with the contextual information in data store(s) 719 directly or through database server 718 associated with the CRM application.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to enhance communication sessions with CRM information. Furthermore, the networked environments discussed in FIG. 7 are for illustration purposes only. Embodiments are not limited to the example applications, modules, or processes.

Figure 8:
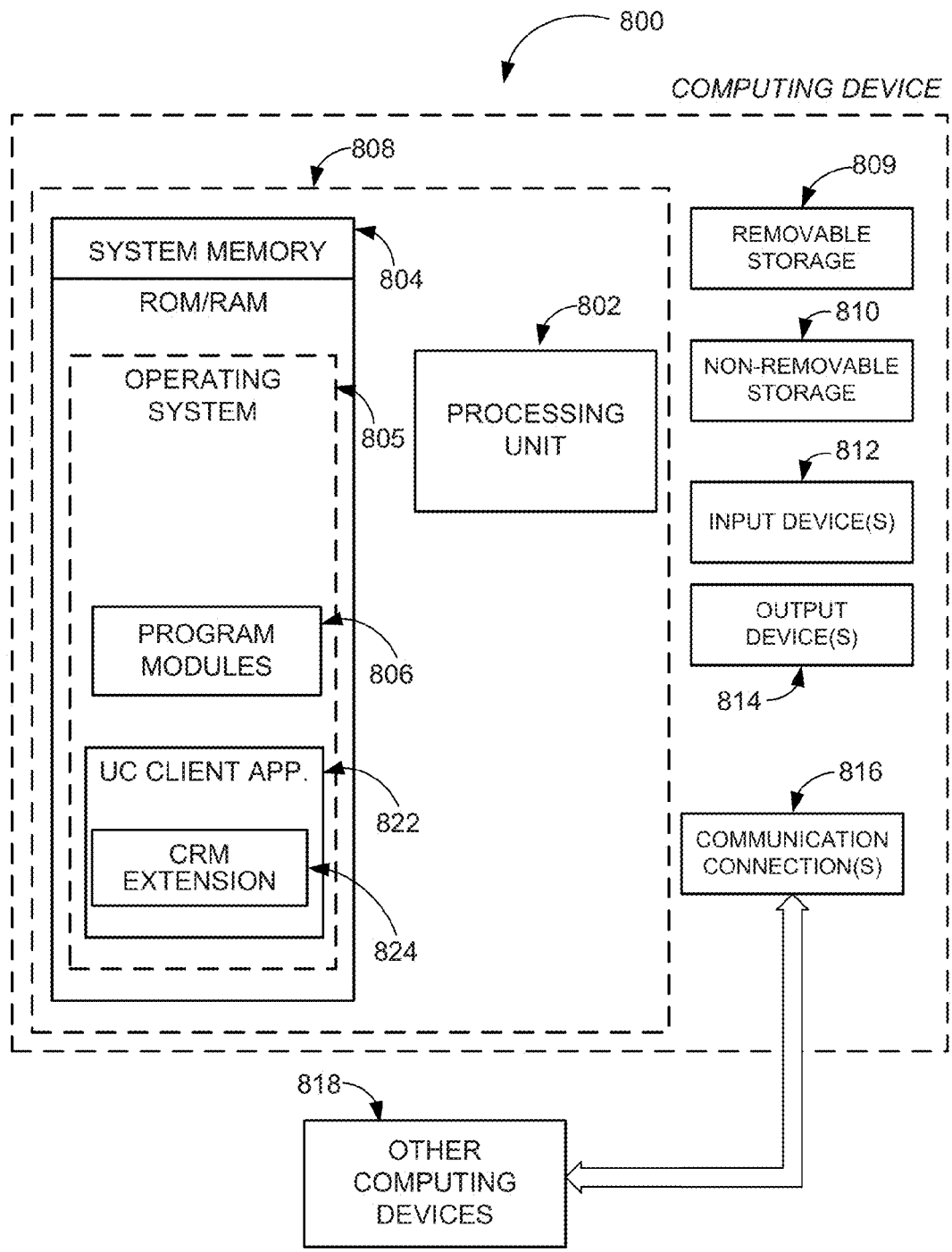
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be any computing device executing a UC client application according to embodiments and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, UC client application 822, and CRM extension 824.

UC client application 822 may enhance communication session with CRM information. The UC client application 822 may query a CRM application through the CRM extension 824 using a call identifier. The call identifier may be a phone number provided by a user interacting with the UC client application 822 to establish a call with a contact. Contextual information associated with the contact may be retrieved from the CRM application and displayed within the UC client application 822. The contextual information may be displayed within a CRM extension window within the UC client application 822. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, an optical capture device for detecting gestures, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wired or wireless network in a distributed computing environment, a satellite link, a cellular link, a short range network, and comparable mechanisms. Other devices 818 may include computer device(s) that execute communication applications, web servers, and comparable devices. Communication connection(s) 816 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
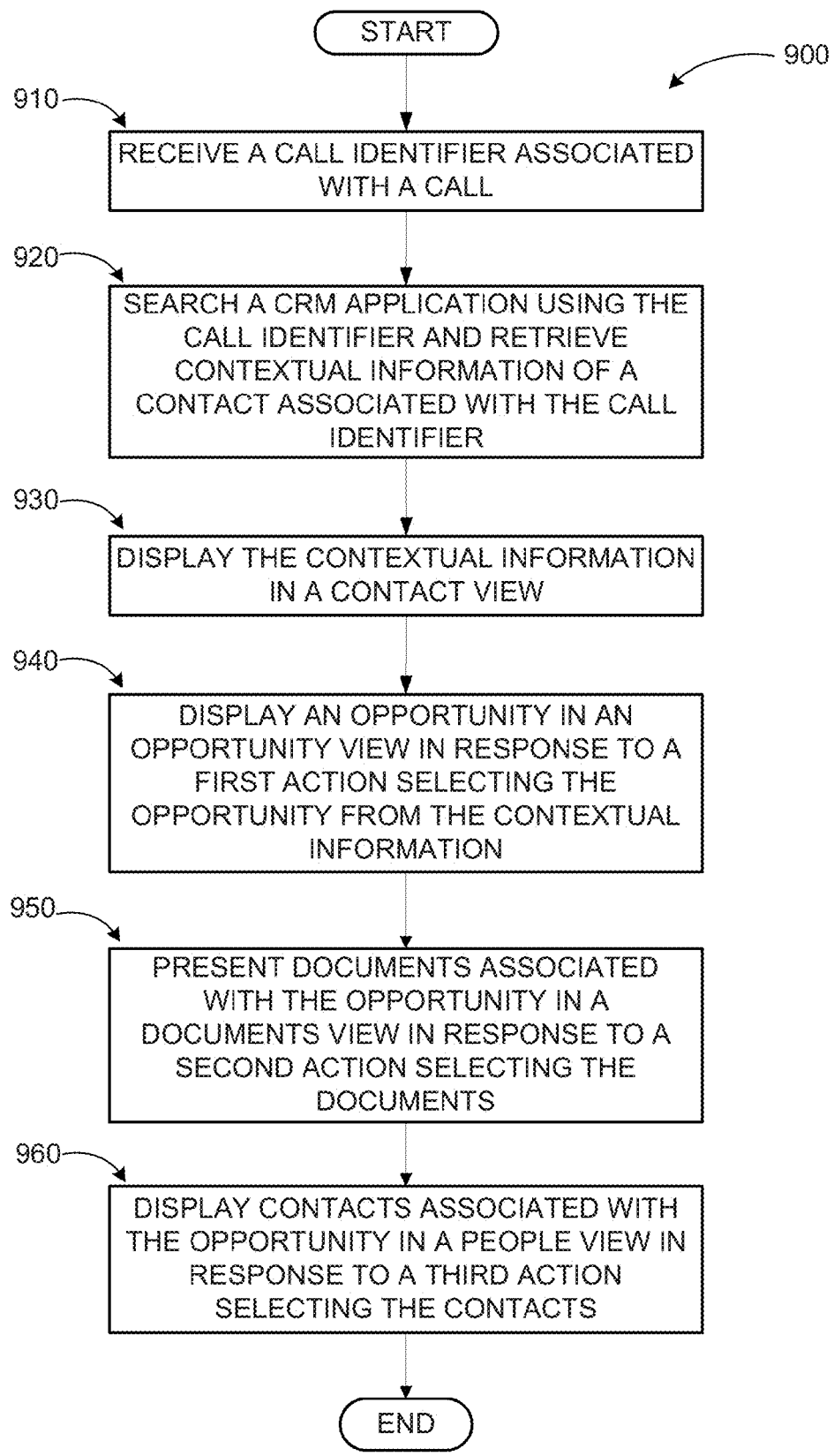
FIG. 9 illustrates a logic flow diagram for a process of enhancing communication sessions with CRM information according to embodiments.

FIG. 9 illustrates a logic flow diagram for a process of enhancing communication sessions with CRM information according to embodiments. Process 900 may be implemented on a UC client application in interaction with a CRM application through a CRM extension.

Process 900 begins with operation 910 receiving a call identifier associated with a call. The call identifier may include a phone number, a name, a credential, and similar identifiers. The UC client application may search a CRM application using the call identifier through a CRM extension and retrieve contextual information associated with the call identifier at operation 920. The contextual information may include attributes associated with a contact associated with the call identifier. Attributes may include name, birthdate, marriage status, organizational role, associated opportunities, relationships, and similar ones.

At operation 930, the contextual information may be displayed in a contact view. The contact view may display attributes associated with the contact, notes associated with the contact, and opportunities associated with the contact At operation 940, in response to a first action selecting an opportunity from the contextual information, the UC client application may display the opportunity in an opportunity view. The opportunity view may display attributes of the opportunity such as a budget, a deadline, a rating and a recent activity associated with the opportunity.

Next, documents associated with the opportunity may be displayed in a documents view in response to a second action selecting the documents at operation 950. Documents may be classified based on categories including library and recommended. In addition, contacts associated with the opportunity may be displayed in a people view in response to a third action selecting the contacts at operation 960. Contacts may be grouped to stakeholders and team members.

The operations included in process 900 are for illustration purposes. A UC client application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for enhancing communication sessions with contextual customer relationship management (CRM) information, the method comprising:
  receiving a call identifier associated with a call;
  searching a CRM application using the call identifier and retrieving the contextual CRM information of one or more contacts associated with the call identifier;
  displaying the contextual CRM information in a contact view within a communication application user interface, wherein the contextual CRM information includes the one or more contacts, financial information, an opportunity, products associated with the opportunity, sales information, sales history, and calendar information, and wherein the opportunity is associated with the one or more contacts;
  associating documents with the contextual CRM information by matching the contextual CRM information to contents of the documents;
  displaying the opportunity in an opportunity view within the communication application user interface, in response to a first action of a user selecting the opportunity from the contextual CRM information;
  presenting the documents associated with the contextual CRM information within a documents view in a recommended category based on the contextual CRM information, in response to a second action of the user selecting the documents;
  associating the documents with the opportunity through the CRM application by a tagging action of the documents, wherein the documents refer to the opportunity and the one or more contacts;
  displaying a first set of the one or more contacts associated with the opportunity in a people view within the communication application user interface, in response to a third action of the user selecting the first set of the one or more contacts;
  providing an addition, an edit, and an update functionality to the contextual CRM information; and
  transmitting at least one of: an addition, an update, and an edit of the contextual CRM information through a CRM extension for storage at the CRM application.

2. The method of claim 1, wherein receiving the call identifier comprises:
  receiving the call identifier associated with one of an incoming call and an outgoing call, wherein the call is one of a phone call, a video call, a multi-modal communication session, and a message exchange session.

3. The method of claim 1, further comprising:
  transmitting the call identifier including at least one of: a phone number, a user name, and a user credential through a CRM extension to the CRM application; and
  receiving the contextual CRM information from the CRM application through the CRM extension within the communication application user interface.

4. The method of claim 1, further comprising:
  displaying the contextual CRM information within a CRM extension window within the communication application user interface.

5. The method of claim 1, further comprising:
  presenting attributes including at least one of: a name, a spouse/partner, an anniversary, a marital status, and a birthday associated with the one or more contacts; and
  presenting at least one of: the opportunity, an account, a budget, a purchase process, and a note associated with the one or more contacts.

6. The method of claim 5, further comprising:
  presenting relationship information associated with another contact associated with one of the one or more contacts within an organization.

7. The method of claim 1, further comprising:
  presenting tab controls to initiate one of: the opportunity view, the people view, the documents view, and a call activity view associated with the opportunity.

8. The method of claim 7, further comprising:
  providing an actionable link summarizing the opportunity to initiate the opportunity view from the contact view.

9. A computing device for enhancing communication sessions with contextual customer relationship management (CRM) information, the computing device comprising:
  a memory;
  a processor coupled to the memory, the processor executing a unified communications (UC) client application in conjunction with instructions stored in the memory, wherein the UC client application is configured to:
  receive a call identifier associated with a call;
  search a CRM application through a CRM extension using the call identifier and retrieving the contextual CRM information of one or more contacts associated with the call identifier;
  display the contextual CRM information in a contact view within a communication application user interface, wherein the contextual CRM information includes the one or more contacts, financial information, an opportunity, products associated with the opportunity, sales information, sales history, and calendar information, and wherein the opportunity is associated with the one or more contacts;
  associate documents with the contextual CRM information by matching the contextual CRM information to contents of the documents;
  display the opportunity in an opportunity view within the communication application user interface, in response to a first action of a user selecting the opportunity from the contextual CRM information;

present the documents associated with the contextual CRM information within a documents view in a recommended category based on the contextual CRM information, in response to a second action of the user selecting the documents;

associate the documents with the opportunity through the CRM application by a tagging action of the documents, wherein the documents refer to the opportunity and the one or more contacts;

display a first set of the one or more contacts associated with the opportunity in a people view within the communication application user interface, in response to a third action of the user selecting the first set of the one or more contacts;

provide an addition, an edit, and an update functionality to the contextual CRM information; and transmit at least one of: an addition, an update, and an edit of the contextual CRM information through the CRM extension for storage at the CRM application.

10. The computing device of claim 9, wherein the UC client application is further configured to:

display a summary of the opportunity including at least one of: a budget, a deadline, and a rating of the opportunity within the opportunity view within the communication application user interface.

11. The computing device of claim 9, wherein the UC client application is further configured to:

in response to a selection of CRM data, provide actionable activity information associated with the selected CRM data.

12. The computing device of claim 11, wherein the UC client application is further configured to:

in response to another selection, activate the actionable activity information to display detailed information associated with a previous activity.

13. The computing device of claim 12, wherein the UC client application is further configured to:

display an actionable control adjacent to the actionable activity information to initiate another communication session with another contact associated with the previous activity.

14. The computing device of claim 12, wherein the UC client application is further configured to:

display an actionable control adjacent to the actionable activity information to display content associated with the previous activity including at least one of: an email, a note, and a message.

15. The computing device of claim 9, wherein the UC client application is further configured to:

present a set of the documents within the documents view in the recommended category based on matching the documents to the contextual CRM information associated with a business preference of the one or more contacts; and present another set of the documents within the documents view in a library category based on associations with the one or more contacts and the opportunity.

16. The computing device of claim 9, where in the UC client application is further configured to:

provide actionable controls within the document view for an operation including one of:

open one of the documents locally;

send one of the documents to a participant of the call; and present one of the documents to one or more participants of the call.

17. A computer-readable memory device with instructions stored thereon for enhancing communication sessions with contextual customer relationship management (CRM) information, the instructions comprising:

receiving a call identifier associated with a call;

searching a CRM application using the call identifier and retrieving the contextual CRM information of one or more contacts associated with the call identifier;

displaying the contextual CRM information in a contact view within a communication application user interface, wherein the contextual CRM information includes the one or more contacts, financial information, an opportunity, products associated with the opportunity, sales information, sales history, and calendar information, and wherein the opportunity is associated with the one or more contacts;

associating documents with the contextual CRM information by matching the contextual CRM information to contents of the documents;

displaying the opportunity in an opportunity view within the communication application user interface, in response to a first action of a user selecting the opportunity from the contextual CRM information;

presenting the documents associated with the contextual CRM information within a documents view in a recommended category based on the contextual CRM information, in response to a second action of the user selecting the documents;

associating the documents with the opportunity through the CRM application by a tagging action of the documents, wherein the documents refer to the opportunity and the one or more contacts;

displaying a first set of the one or more contacts associated with the opportunity in a people view within the communication application user interface, in response to a third action of the user selecting the first set of the one or more contacts;

providing an addition, an edit, and an update functionality to the contextual CRM information; and transmitting at least one of: an addition, an update, and an edit of the contextual CRM information through a CRM extension for storage at the CRM application.

18. The computer-readable memory device of claim 17, wherein the instructions further comprise:

presenting the one or more contacts associated with the opportunity in at least one of: a stakeholder, and a team member category within the people view to display at least one of: a role and a presence information associated with the contacts.

19. The computer-readable memory device of claim 18, wherein the instructions further comprise:

providing controls within the people view for an operation including at least one of:

starting a chat with one of the one or more contacts;

starting a message session with one of the one or more contacts; and adding one of the one or more contacts to the call.

* * * * *